(12) United States Patent
Tonami

(10) Patent No.: US 9,210,295 B2
(45) Date of Patent: Dec. 8, 2015

(54) IMAGE FORMING DEVICE THAT INDICATES USE OF ENVIRONMENTALLY FRIENDLY INK OR TONER

(71) Applicant: Sharp Kabushiki Kaisha, Osaka (JP)

(72) Inventor: Kazumasa Tonami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/397,129

(22) PCT Filed: Mar. 29, 2013

(86) PCT No.: PCT/JP2013/059436
§ 371 (c)(1),
(2) Date: Oct. 24, 2014

(87) PCT Pub. No.: WO2013/161509
PCT Pub. Date: Oct. 31, 2013

(65) Prior Publication Data
US 2015/0116781 A1    Apr. 30, 2015

(30) Foreign Application Priority Data

Apr. 25, 2012   (JP) .................................. 2012-099671

(51) Int. Cl.
*H04N 1/40*        (2006.01)
*G03G 15/36*       (2006.01)
*H04N 1/00*        (2006.01)

(52) U.S. Cl.
CPC ........... *H04N 1/40093* (2013.01); *G03G 15/36* (2013.01); *H04N 1/00846* (2013.01); *H04N 1/00864* (2013.01); *H04N 1/00925* (2013.01); *H04N 1/40062* (2013.01); *H04N 2201/0094* (2013.01)

(58) Field of Classification Search
None
See application file for complete search history.

(56) References Cited

U.S. PATENT DOCUMENTS

2010/0124637 A1 *  5/2010  Stiel et al. ..................... 428/193
2013/0107301 A1 *  5/2013  Takagi .......................... 358/1.13

FOREIGN PATENT DOCUMENTS

| JP | 11-355564   | 12/1999   |
|----|-------------|-----------|
| JP | 2006-010783 | 1/2006    |
| JP | 2007-243730 | 9/2007    |
| JP | 2007-283719 | * 11/2007 |
| JP | 2008-72520  | 3/2008    |
| JP | 2008-243140 | * 10/2008 |
| JP | 2010-178056 | 8/2010    |

* cited by examiner

*Primary Examiner* — Steven Kau
(74) *Attorney, Agent, or Firm* — Keating & Bennett, LLP

(57) ABSTRACT

Through the present invention, an image can be formed in which the ink or toner used is properly displayed, without falsification or fraudulent display, even in the case of a printed matter which includes a specific image indicating information relating to ingredients of the ink or toner. An image forming portion (105) of an image forming device (100) forms an image on a recording medium on the basis of image data for forming an image. A specific-image determining portion (106a) distinguishes whether a specific image indicating information relating to ingredients of ink or toner used to form the image is included in the image data for forming the image. A specific-image substitution processing portion (106b) substitutes the specific image with a predetermined ingredient label mark for indicating ingredients of the ink or toner used by the image forming portion (105) when it is determined by the specific-image determining portion (106a) that the image data for forming the image include a specific image.

5 Claims, 4 Drawing Sheets

IMAGE FORMING DEVICE THAT INDICATES USE OF ENVIRONMENTALLY FRIENDLY INK OR TONER

CROSS-REFERENCE TO RELATED APPLICATIONS

This application is a National Phase application filed under 35 USC 371 of PCT International Application No. PCT/JP2013/059436 with an International Filing Date of Mar. 29, 2013, which claims under 35 U.S.C. §119(a) the benefit of Japanese Application No. 2012-099671, filed Apr. 25, 2012, the entire contents of which are incorporated herein by reference.

TECHNICAL FIELD

The present invention relates to an image forming device, and more specifically to an image forming device which performs image formation on a recording medium using ink or toner.

BACKGROUND OF THE INVENTION

An image forming device which performs image formation of image data read from a document image or image data output from external equipment or a recording medium on a medium such as a recording sheet is prevalent. As an image forming device, a multi-functional peripheral provided with a plurality of functions such as a copying function, a printer function, a facsimile function, a data transmission function and a data filing function is also prevalent. In image forming processing in an image forming device, ink, toner or the like is used for performing image formation.

Currently, as printing ink which is applied to image formation, environmentally friendly type ink is used. For the environmentally friendly type ink, ink in which a part of a petroleum-based organic solvent is replaced with a vegetable-based oil for reducing generation of a volatile organic compound, and the like are used, for example. When scattering in the air, the volatile organic compound is said to generate photochemical oxidants and SPM (suspended particulate matters) and cause health problems such as a respiratory disease and multiple chemical sensitivity. Ink in which the volatile organic compound is decreased is known as the environmentally friendly type ink.

As the environmentally friendly type ink, for example, one called vegetable oil ink is ink in which a specific vegetable oil, ester made from a vegetable oil, or the like is included in a fixed proportion. In addition, one called soy ink is ink in which apart of a conventional petroleum solvent is replaced with a soy oil and a vegetable oil. Moreover, one called W2 (Water Washable) ink is water washable ink which is made from a 100% vegetable oil. Further, one called rice ink is ink in which a rice bran oil is used.

When a printed matter is created using the environmentally friendly type ink as described above, printing a predetermined logo mark indicating that ink in which environmentally friendly type ink is contained as an ingredient is used is performed on the printed matter. For example, logo marks such as a vegetable oil ink mark, a soy ink mark, a W2 ink mark and a rice ink mark are registered as trademarks, and a user who uses each environmentally friendly type ink is to clarify that environmentally friendly type ink is used for a printed matter by printing a logo mark corresponding to ink to be used on the printed matter.

On the other hand, some image forming devices having the copying function are provided with a function for reading information having copy restriction such as a confidential document and information on copyright and the like from a document, and restricting copying concerning these information.

For example, Patent Literature 1 discloses an image forming device which detects a preliminarily registered pattern from image data acquired by a reading portion and replaces a pixel value in an area of the detected pattern with a predetermined pixel value for image formation.

Moreover, Patent Literature 2 discloses an image reading device which detects reading inhibiting information relating to copyright such as a copyright mark and a logo which are added to a document image or the like and adds copy inhibiting information to image data itself that is read therefrom or deletes the image data.

PRIOR ART DOCUMENT

Patent Documents

Patent Document 1: Japanese Laid-Open Patent Publication No. 2008-72520
Patent Document 2: Japanese Laid-Open Patent Publication No. H11-355564

SUMMARY OF THE INVENTION

Problem to be Solved by the Invention

As described above, in a printed matter for which the environmentally friendly type ink is used, a logo mark corresponding to the ink is printed in some cases. In the case of further copying such a printed matter to use, the logo mark of the environmentally friendly type ink is copied and printed also on a printed matter created by copying. At this time, in a case where ink or toner used in an image forming device is different from those of the logo marks of the environmentally friendly type ink, the printed matter is to include falsification information, so that a problem is caused.

Moreover, as Patent Documents 1 and 2, though there is a function such that image data in a predetermined area of a document is replaced or deleted when copying a document image, a function which is able to address a challenge at a time of copying a specific image indicating ingredients of ink or toner such as a logo mark of the environmentally friendly type ink is not known.

The present invention has been made in view of circumstances as described above, and an object thereof is to provide an image forming device that is able to perform image formation in which ink or toner used is displayed properly without being falsification or fraudulent display, even in the case of a printed matter which includes a specific image indicating information relating to ingredients of the ink or the toner.

Means for Solving the Problem

To solve the above problems, a first technical means of the present invention is an image forming device, comprising: an image forming portion for performing image formation on a recording medium based on image data for image formation, a specific-image determining portion for judging whether or not a specific image indicating information relating to ingredients of ink or toner used for image formation is included in the image data for image formation, and a specific-image substitution processing portion for substituting the specific image with a predetermined ingredient label mark indicating the ingredients of ink or toner used by the image forming portion when it is determined by the specific-image determining portion that the image data for image formation includes the specific image.

A second technical means is the image forming device of the first technical means, wherein a memory portion for storing the predetermined ingredient label mark so as to be associated with ingredient information indicating the ingredients of ink or toner in advance is included, and when it is determined by the specific-image determining portion that the image data for image formation includes the specific image, the specific-image substitution processing portion acquires the ingredient information from a recording portion provided in an ink cartridge or a toner cartridge which is used in the image forming portion, extracts the ingredient label mark stored in the memory portion so as to be associated with the acquired ingredient information from the memory portion, and substitutes the specific image with the extracted ingredient label mark.

A third technical means is the image forming device of the second technical means, wherein in a case where, at a time of acquiring the ingredient information from the recording portion provided in the ink cartridge or the toner cartridge which is used in the image forming portion, the ingredient label mark associated with the acquired ingredient information is not stored in the memory portion, the specific-image substitution processing portion deletes the specific image from the image data for image formation.

A fourth technical means is the image forming device of the first technical means, wherein a memory portion for holding image data of a model pattern corresponding to the specific image in advance is included, and the specific-image determining portion performs pattern matching of the image data for image formation and the model pattern stored in the memory portion, and, when it is determined that an image matching the model pattern is included in the image data for image formation, determines that the specific image is included in the image data for image formation.

A fifth technical means is the image forming device of the first technical means, wherein the specific image is an image of a logo mark for displaying ingredients of environmentally friendly type ink in which a vegetable-based oil is used.

Effect of the Invention

According to the present invention, it is possible to provide an image forming device enabling to perform image formation in which ink or toner used is displayed properly without being falsification or fraudulent display, even in the case of a printed matter which includes a specific image indicating information relating to ingredients of the ink or the toner.

PREFERRED EMBODIMENT OF THE INVENTION

Figure 1:
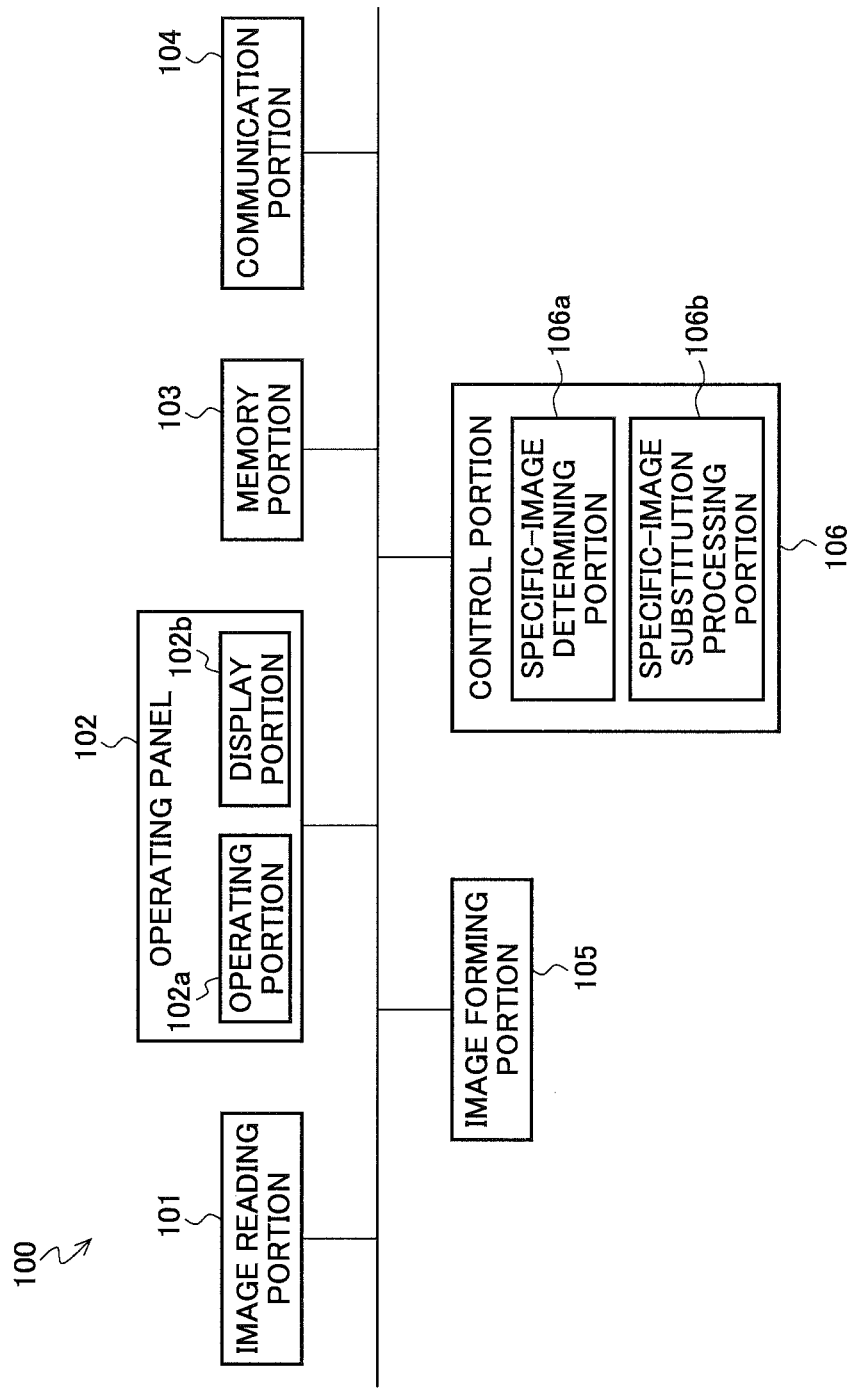
FIG. 1 is a block diagram showing an example of a main configuration of an image forming device according to the present invention.

FIG. 1 is a block diagram showing an example of a main configuration of an image forming device according to the present invention.

An image forming device 100 of the present example is configured as a multi-functional peripheral which is able to execute a copy mode, a print mode, a scanner mode, a facsimile mode and the like.

An image reading portion 101 is a reading portion for optically reading a document image, and is provided with a light source for irradiating a document for reading with light and an image sensor, for example, like a CCD (Charge Coupled Device). By detecting light from the light source, which is reflected on a document face, with the CCD, the document image is able to be read.

An operating panel 102 has an operating portion 102a and a display portion 102b. The operating portion 102a is for receiving a user operation, and is provided with various operating keys. The display portion 102b is composed of, for example, a liquid crystal display, and serves as a touch panel. Touch keys are formed in an operating screen displayed on the display portion 102b, which also function as operating keys.

A memory portion 103 is, for example, a nonvolatile memory portion, and stores in advance a control program for controlling each portion of hardware, a specific-mage determining program for determining matching of image data and a model patter by pattern matching processing of a specific image, an image processing program for substituting image data matching the model pattern with a predetermined ingredient label mark, image data of the model pattern used by the specific-image determining program, image data of the ingredient label mark to be substituted, which is used by the image processing program, and the like.

Moreover, the memory portion 103 stores image data input from the image reading portion 101 or image data input from a communication portion 104. The stored image data is output by image formation (printing), data transmission, facsimile communication or the like in accordance with processing to be executed.

The communication portion 104 is provided with a communication interface, and the communication interface is connected to a network to allow communication with an external device via the network. Moreover, the communication portion 104 is provided with a modem device and a telephone line is connected thereto to allow facsimile communication. Further, the communication portion 104 is provided with a communication terminal and a communication card for wireless communication. A recording medium such as a USB memory or an IC card is connected to the communication terminal, and the communication portion 104 performs transmission/reception of data to/from the recording medium. In addition, transmission/reception of data by wireless communication with the communication terminal such as a mobile phone or a PDA is allowed to be performed through the communication card.

An image forming portion 105 processes image data of a document image read by the image reading portion 101 or image data input from external equipment, an external recording medium or the like via the communication portion 104 to perform image formation (printing) on a recording medium such as a recording sheet. The image forming portion 105 is able to perform image formation by an electrophotographic system in which laser beam is scanned according to image data to generate an electrostatic latent image on a photoreceptor drum and toner is supplied to the electrostatic latent image to visualize and transfer onto a recording sheet. Further, it may be configured to perform image formation by an ink-jet system, a thermal transfer system, a sublimation system or the like, in addition to performing image formation by the electrophotographic system using a laser writing device. In the image forming portion 105, ink or toner is used according to the system of image formation.

A control portion 106 is provided with a CPU that controls each hardware of the image forming device 100 and a RAM that temporarily holds data needed at a time of control or the like. The control portion 106 performs control of the hardware and the like by reading and executing various programs from the memory portion 103 as necessary. Moreover, a specific-image determining portion 106a and a specific-image substitution processing portion 106b are included as functions of the control portion 106, by which specific-image determining processing and specific-image substitution processing according to the present invention are executed.

When performing image formation of image data at the image forming portion 105, the specific-image determining portion 106a determines whether or not a specific image is included in the image data subjected to image formation. Judgment of whether or not the specific image is included in the image data subjected to image formation is able to be performed by publicly known pattern matching. In the pattern matching, a predetermined model patter is prepared in advance as the specific image to be stored in the memory portion 103.

As the model pattern, a specific image indicating information relating to ingredients of ink or toner used for image formation is used. For example, it is possible to use an image of a predetermined logo mark that is used when a printed matter or the like is created using environmentally friendly type ink.

As described above, examples of the logo mark of environmentally friendly type ink include logo marks such as a vegetable oil ink mark, a soy ink mark, a W2 ink mark and a rice ink mark, which are registered as trademarks. A user who uses these environmentally friendly type inks prints a logo mark according to the ink to be used on a printed matter to thereby clarify that the printed matter uses the environmentally friendly type ink. In addition thereto, it is possible to be used as an image of the model pattern as long as being used as an image indicating information relating to ingredients of ink or toner.

When image formation is performed at the image forming portion 105 by a copy function, a printer function or the like, before image forming processing is performed, the specific-image determining portion 106a performs pattern matching with the image data and the model pattern and determines existence of a specific image matching the model pattern or a specific image approximate to the model patter in the image data to determine that the model pattern is included in the image data in these cases.

When the specific-image determining portion 106a determines that the model pattern is included in the image data subjected to image formation, the specific-image substitution processing portion 106b performs processing for substituting the specific image corresponding to the model patter included in the image data with an image of a predetermined ingredient label mark. The ingredient label mark is defined in advance according to ink or toner used for image formation in the image forming device 100. For example, when toner called so-called bio-toner using vegetable-derived raw materials is used, an ingredient label mark indicating being bio-toner is defined in advance.

The above-described ingredient label mark is able to be defined in advance appropriately as one indicating ingredients of toner that is actually used. Further, when the image forming portion 105 is for performing image formation with ink, an ingredient label mark according to ingredients of the ink is able to be defined in advance.

On the other hand, ingredient information indicating ingredients of toner or ink is stored in advance in the memory portion provided in a cartridge for supplying toner or ink. For example, when toner supplied from a toner cartridge is bio-toner, predetermined ingredient information indicating being bio-toner is stored in a recording portion such as a memory of the toner cartridge.

Moreover, in the image forming device 100, the ingredient information stored in the cartridge for supplying toner or ink and image data of an ingredient label mark according to the ingredient information are stored to be associated with each other in advance in the memory portion 103.

When the specific-image substitution processing portion 106b substitutes the specific image corresponding to the model pattern included in the image data with an ingredient label mark, the specific-image substitution processing portion 106b acquires ingredient information indicating ingredients of toner or ink from the cartridge of toner or ink, and reads image data of the ingredient label mark associated with the ingredient information from the memory portion 103. Then, the image data corresponding to the model pattern included in the image data subjected to image formation is substituted with image data of the ingredient label mark read from the memory portion 103. In the image forming portion 105, image formation is performed using the image data that is substituted with the ingredient label mark by processing of the specific-image substitution processing portion 106b. This makes it possible to print the ingredient label mark corresponding to ingredients of toner or ink that is actually used and to prevent that a printed matter including a logo mark indicating toner or ink that is not actually used is created.

Figure 2:
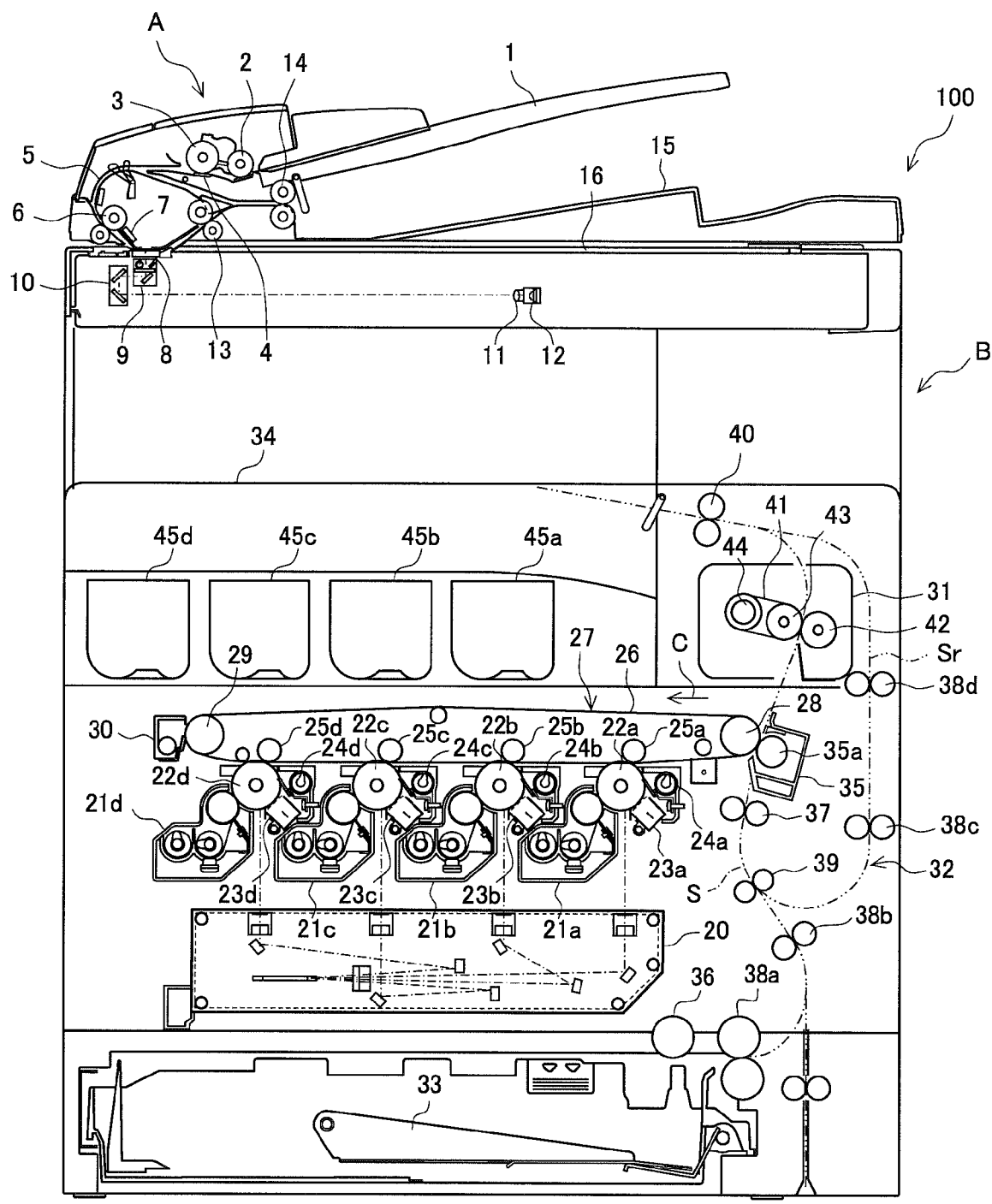
FIG. 2 is a diagram showing an example of a specific configuration of the image forming device according to the present invention.

FIG. 2 is a diagram showing an example of a specific configuration of the image forming device according to the present invention.

The image forming device 100 is provided with an image reading device A that reads an image of a document and a device main body B that forms the image of the document read by the image reading device A or an image received from outside on a recording sheet in color or monochrome.

The image reading device A corresponds to the image reading portion 101 of FIG. 1, and is provided with a document set tray 1, a pickup roller 2, a separation roller 3, a separation pad 4, a conveyance path 5, registration rollers 6, a reading guide 7, a reading glass 8, a first scanning portion 9, a second scanning portion 10, an imaging lens 11, a CCD 12, a conveyance roller 13, a paper discharge roller 14, a paper discharge tray 15 and a document platen glass 16.

When a document is set on the document set tray 1, the pickup roller 2 is pressed against a front face of the document. Then, by rotating of the pickup roller 2, the document is pulled out from the tray 1. Thereafter, the document passes between the separation roller 3 and the separation pad 4 so as to be separated one by one, and then conveyed to the conveyance path 5.

On the conveyance path 5, a leading edge of the document abuts against the registration rollers 6, and the leading edge becomes aligned parallel to the registration rollers 6. Then, the document is conveyed by the registration rollers 6, and passes between the reading guide 7 and the reading glass 8. At this time, a front face of the document is irradiated with light from a light source provided in the first scanning portion 9 via the reading glass 8, and the reflected light enters the first scanning portion 9 via the reading glass 8. This reflected light is reflected by mirrors provided in the first scanning portion 9 and the second scanning portion 10 to be guided to the imaging lens 11. An image of the document is then formed on the CCD 12 by the imaging lens 11. The CCD 12 reads the image of the document, and outputs image data that indicates the image of the document. Further, the document is conveyed by the conveyance roller 13, and discharged onto the paper discharge tray 15 via the paper discharge roller 14.

The image forming device 100 is able to read a document placed on the document platen glass 16. The registration rollers 6, the reading guide 7, the paper discharge tray 15 and the like are integrated with members above them and they form a cover body that is provided so as to be openable and closable at a rear face side of the document reading device A. When this cover body is opened, the document platen glass 16 is uncovered, and a document is able to be placed on the document platen glass 16.

When the cover body is closed after the document is placed, the first scanning portion 9 and the second scanning portion 10 are moved in a sub-scanning direction, and a front face of the document on the document platen glass 16 is exposed by the first scanning portion 9. Reflected light from the front face of the document is guided to the imaging lens 11 by the first scanning portion 9 and the second scanning portion 10, and an image of the document is formed on the CCD 12 by the imaging lens 11. At this time, the first scanning portion 9 and the second scanning portion 10 are moved while maintaining a predetermined speed relationship therebetween. The entire image of the document read in this manner is transmitted to the device main body B of the image forming device as image data, and is subjected to image formation (printed) on a recording medium such as a recording sheet in the device main body B.

The device main body B of the image forming device 100 is provided with a laser exposure device 20, development devices 21a to 21d, photoreceptor drums 22a to 22d, chargers 23a to 23d, cleaner devices 24a to 24d, an intermediate transfer belt device 27, a fixing device 31, a sheet conveyance device 32, a paper feed tray 33, and a paper discharge tray 34.

Image data handled in the image forming device 100 of the present example corresponds to a color image using respective colors of black (K), cyan (C), magenta (M), and yellow (Y), or corresponds to a monochrome image using a single color (for example, black). Accordingly, four sets each of the development devices 21a to 21d, the photoreceptor drums 22a to 22d, the chargers 23a to 23d and the cleaner devices 24a to 24d are provided in order to form four types of latent images corresponding to the respective colors.

The photoreceptor drums 22a to 22d are drums whose surfaces are charged to a predetermined electric potential, and disposed substantially in the center of the device main body B. The chargers 23a to 23d are charging portions that uniformly charge the surfaces of the photoreceptor drums 22a to 22d to a predetermined electric potential.

The laser exposure device 20 is a laser scanning portion (LSU) provided with a laser diode and a reflection mirror. The laser exposure device 20 exposes the surfaces of the charged photoreceptor drums 22a to 22d in accordance with image data, and forms electrostatic latent images on the surfaces thereof in accordance with the image data.

The development devices 21a to 21d develop the electrostatic latent images formed on the photoreceptor drums 22a to 22d with toner of black (K), cyan (C), magenta (M) and yellow (Y). The cleaner devices 24a to 24d remove and collect residual toner on the surfaces of the photoreceptor drums 22a to 22d after development and transferring of the images.

Above the development devices 21a to 21d, toner cartridges 45a to 45d containing toner of respective colors of cyan, magenta, yellow and black are attached so as to be attachable and detachable to and from the image forming device 100. Each of the toner cartridges 45a to 45d has the same configuration except for having different toner contained.

Each of the toner cartridges 45a to 45d is provided with not-shown memory portions for holding ingredient information indicating ingredients of toner contained inside. When it is determined by pattern matching of image data for image formation and a model pattern that a specific image corresponding to the model pattern is included in the image data at a time of image formation, the ingredient information stored in the memory portion of the toner cartridges 45a to 45d is read and image formation is performed by substituting the specific image of the image data with an ingredient label mark that is stored to be associated with the ingredient information.

The intermediate transfer belt device 27 disposed above the photoreceptor drums 22a to 22d is provided with an intermediate transfer belt 26, an intermediate transfer belt driving roller 28, a driven roller 29, intermediate transfer rollers 25a to 25d, and an intermediate transfer belt cleaning device 30.

The intermediate transfer belt 26 is stretched and supported by the intermediate transfer belt driving roller 28, the intermediate transfer rollers 25a to 25d and the driven roller 29, which cause the intermediate transfer belt 26 to move to circulate in a direction of an arrow C. The intermediate transfer rollers 25a to 25d are rotatably supported in the vicinity of the intermediate transfer belt 26. In addition, the intermediate transfer rollers 25a to 25d are in pressure contact with the photoreceptor drums 22a to 22d via the intermediate transfer belt 26 to apply a transfer bias for transferring toner images on the photoreceptor drums 22a to 22d onto the intermediate transfer belt 26.

The intermediate transfer belt 26 is provided so as to be in contact with each of the photoreceptor drums 22a to 22d, and superimposes and transfers the toner images on the surfaces of the respective photoreceptor drums 22a to 22d sequentially onto the intermediate transfer belt 26 so as to form a color toner image. Transferring of the toner images from the photoreceptor drums 22a to 22d onto the intermediate transfer belt 26 is performed by the intermediate transfer rollers 25a to 25d that are in pressure contact with a rear side of the intermediate transfer belt 26. A high-voltage transfer bias for transferring the toner images is applied to the intermediate transfer rollers 25a to 25d.

The toner images on the surfaces of the respective photoreceptor drums 22a to 22d are layered on the intermediate transfer belt 26 and become color toner images indicated by image data. The toner images of the respective colors layered in this manner are conveyed together with the intermediate transfer belt 26 and transferred onto a recording sheet by a secondary transfer device 35 that is in contact with the intermediate transfer belt 26.

The intermediate transfer belt 26 and a transfer roller 35a included in the secondary transfer device 35 are in pressure contact with each other to form a nip region. Moreover, a voltage for transferring the toner images of the respective colors on the intermediate transfer belt 26 onto a recording sheet is applied to the transfer roller 35a.

The toner image on the intermediate transfer belt 26 may not be completely transferred onto the recording sheet by the secondary transfer device 35 and toner may remain on the intermediate transfer belt 26, and this residual toner causes toners to be mixed in a following step. Therefore, the intermediate transfer belt cleaning device 30 removes and collects the residual toner. The intermediate transfer belt cleaning device 30 is provided with, for example, a cleaning blade that is in contact with the intermediate transfer belt 26 as a cleaning member, and the intermediate transfer belt 26 is supported by the driven roller 29 from the rear side at a part in contact with the cleaning blade.

The paper feed tray 33 is a tray for storing recording sheets and is provided in the lower side of the image forming portion of the device main body B. Moreover, the paper discharge tray 34 provided in the upper side of the image forming portion is a tray on which a printed recording sheet is placed facedown.

In addition, the device main body B is provided with the sheet conveyance device 32 for sending a recording sheet on the paper feed tray 33 to the paper discharge tray 34 through the secondary transfer device 35 and the fixing device 31. This sheet conveyance device 32 has an S-shaped sheet conveyance path S, and a pickup roller 36, registration rollers 37, the fixing device 31, and respective conveyance rollers 38a to 38d, pre-registration rollers 39 and a paper discharge roller 40 are disposed along the sheet conveyance path S.

The pickup roller 36 is a draw-in roller that is provided on an end part of the paper feed tray 33 and supplies recording sheets one by one from the paper feed tray 33 to the sheet conveyance path S. The respective conveyance rollers 38a to 38d are small rollers for promoting and assisting conveyance of a recording sheet, and are provided in a plurality of positions along the sheet conveyance path S.

The registration rollers 37 temporarily stop a recording sheet being conveyed to align a leading edge of the recording sheet, and convey the recording sheet in a timely manner in synchronization with rotation of the photoreceptor drums 22a to 22d and the intermediate transfer belt 26 so that the color toner image on the intermediate transfer belt 26 is transferred onto the recording sheet in the nip region between the intermediate transfer belt 26 and the secondary transfer device 35.

The fixing device 31 receives a recording sheet on which a toner image has been transferred, and conveys this recording sheet to be sandwiched in the nip region between a fixing belt 41 and a pressure roller 42. Then, the fixing device 31 fixes the toner image on the recording sheet by heating and pressing the recording sheet.

The fixing roller 43 is a roller that fixes toner to the recording sheet. A heating roller 44 is provided with a heater lamp and supplies heat generated by the heater lamp to the fixing belt 41. The fixing belt 41 heated by the heat of the heater lamp heats the recording sheet to fix the toner image. The recording sheet on which toner images of respective colors have been fixed is discharged onto the paper discharge tray 34 by the paper discharge roller 40.

When printing is performed not only for a front face but both faces of a recording sheet, after an image on the front face of the recording sheet has been fixed by the fixing device 31, while the recording sheet is being conveyed by the paper discharge roller 40 in the sheet conveyance path S, the paper discharge roller 40 is stopped and then rotated in reverse. Then, the recording sheet is passed through a reverse path Sr so that the front and back thereof are reversed, and then guided to the registration rollers 37. Thereafter, in the same manner as the front face of the recording sheet, an image is recorded and fixed on the back face of the recording sheet, and the recording sheet is discharged to the paper discharge tray 34.

Figure 3:
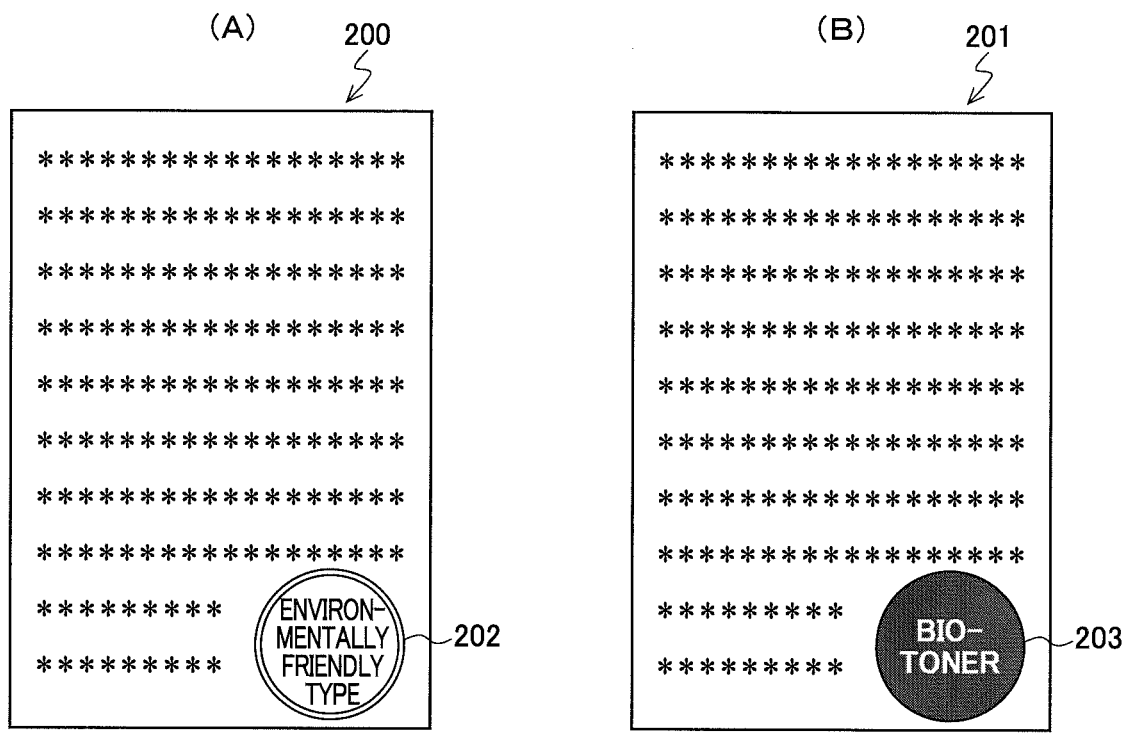
FIG. 3 is a diagram showing a state when image formation is performed by substituting a logo mark of environmentally friendly type ink included in a document image with an ingredient label mark.

FIG. 3 is a diagram showing a state when image formation is performed by substituting information relating to ingredients of ink or toner included in a document image with an ingredient label mark.

As described above, in the embodiment of the image forming device according to the present invention, when image data is subjected to image formation, whether or not a specific image is included in the image data subjected to image formation is determined, and when it is determined that the specific image is included, image formation is performed by substituting a predetermined ingredient label mark associated with ingredient information of toner or ink read from the recording portion of a toner cartridge or an ink cartridge with the specific image.

For example, it is set that a printed matter 200 as shown in FIG. 3 (A) is copied in the image forming device. It is set that a predetermined logo mark 202 that is used when environmentally friendly type ink is used is printed on the printed matter 200 as information relating to ingredients of ink or toner. As described above, for the predetermined logo mark 202, logo marks such as a vegetable oil ink mark, a soy ink mark, a W2 ink mark and a rice ink mark, which are registered as trademarks, are used. By printing these logo marks 202 according to ink used for printing of the printed matter 200, it is clarified that the printed matter 200 uses the environmentally friendly type ink.

When the printed matter 200 as shown in FIG. 3 (A) is copied in the image forming device, the image forming device reads an image of the printed matter 200, performs pattern matching with read image data of the printed matter 200 and a model pattern defined in advance, and detects existence of an image matching the model pattern or an image approximate to the model pattern in the read image data to judge whether or not the model pattern is included in the read image data.

The model pattern corresponds to a predetermined image that includes information relating to ingredients of ink or toner, and a plurality of model patterns such as images indicating logo marks used for environmentally friendly type ink as described above are able to be set. In the pattern matching, pattern matching is performed for each of the plurality of model patterns and whether or not an image corresponding to any one of the model patterns is included in the image data of the printed matter 200 is judged.

When determining that the model pattern is included in the image data, the image forming device substitutes the image corresponding to the model pattern included in the image data with an image of a predetermined ingredient label mark. At this time, the image forming device reads ingredient information stored in the recording portion of a toner cartridge or an ink cartridge, extracts an ingredient label mark that is stored to be associated with the ingredient information, and substitutes the image data of a logo mark used for environmentally friendly type ink with the image data of the ingredient label mark.

When substituting image data, it is possible to substitute image data in an area of a predetermined shape (for example, circle or rectangle) including an environmentally friendly type logo mark with image data including an ingredient label mark having the same shape and size. In addition, it is possible to perform processing for enlarging or reducing the ingredient label mark that is stored in advance appropriately and substituting the logo mark 202 with the ingredient label mark in accordance with the size of the logo mark 202 printed on the printed matter 200. Then, the image data substituted with the ingredient label mark is subjected to image formation on a recording sheet or the like.

FIG. 3 (B) shows a printed matter 201 subjected to image formation by substituting the logo mark 202 used for environmentally friendly type ink with a predetermined ingredient label mark 203. The ingredient label mark 203 is defined in advance according to ink or toner used for image formation in the image forming device 100, and, for example, when toner called so-called bio-toner using vegetable-derived raw materials is used, an ingredient label mark indicating being bio-toner is defined in advance.

This makes it possible to print the ingredient label mark 203 corresponding to ingredients of ink or toner that is actually used and to prevent that a printed matter including information indicating ingredients of ink or toner that is not actually used is created.

In addition, in a case where it is judged that a predetermined specific image indicating information relating to ingredients of ink or toner, such as the logo mark 202 used for environmentally friendly type ink, is included in image data read from the printed matter 200, when an ingredient label mark associated with the specific image is not stored, the image forming device deletes the specific image such as the logo mark 202 printed on the printed matter 200 from the image data, and performs image formation of the image data in a state where it is deleted. This makes it possible to prevent that information indicating ingredients of ink or toner that is not used at a time of copying is printed.

Figure 4:
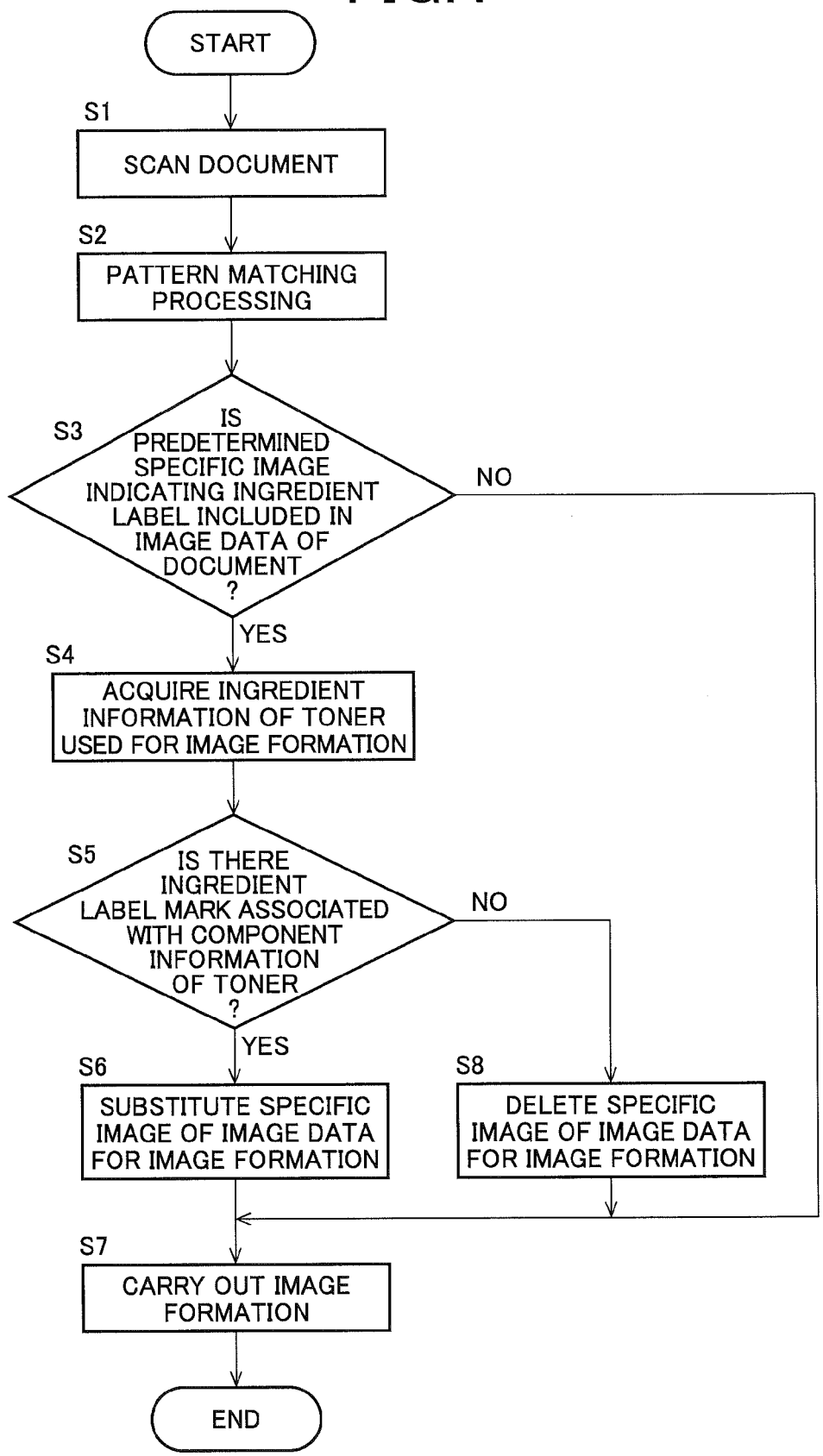
FIG. 4 is a flowchart explaining an example of processing of the image forming device according to the present invention.

FIG. 4 is a flowchart explaining an example of processing of the image forming device according to the present invention. Description will be given below with reference to the configuration of FIG. 1.

When copying a document image, first, the image forming device 100 scans a document by the image reading portion 101 to read an image of the document (step S1). The specific-image determining portion 106a of the control portion 106 then uses a model pattern stored in the memory portion 103 in advance to perform pattern matching processing of image data of the document and the model pattern (step S2).

The specific-image determining portion 106a determines whether or not a predetermined specific image indicating ingredients of ink or toner, such as a logo mark used for environmentally friendly type ink, is included in the image data of the document as a result of the pattern matching (step S3).

When the predetermined specific image indicating ingredients of ink or toner is not included in the image data of the document, image formation is carried out as it is by the image forming portion 105 (step S7).

Further, when the predetermined specific image indicating ingredients of ink or toner is included in the image data of the document, the specific-image substitution processing portion 106b acquires ingredient information of toner stored in the recording portion of a toner cartridge (step S4). Then, the specific-image substitution processing portion 106b judges whether or not an ingredient label mark associated with the ingredient information acquired from the toner cartridge is stored in the memory portion 103 (step S5).

When there is the ingredient label mark associated with the acquired ingredient information, the specific-image substitution processing portion 106b substitutes the specific image included in the image data for image formation with the ingredient label mark stored in the memory portion 103 (step S6), and image formation is carried out by the image forming portion 105 (step S7).

Further, when there is no ingredient label mark associated with the ingredient information acquired at step S5, the specific-image substitution processing portion 106b deletes the predetermined specific image included in the image data of the document (step S8), and the image data is subjected to image formation by the image forming portion 105 (step S7).

Note that, in the case of an image forming device that uses not a toner cartridge but an ink cartridge in the above-described processing, the same processing is able to be performed by acquiring ingredient information of ink from the ink cartridge.

In addition, also in the case of performing image formation not only for image data read by the image reading portion but also for image data output from external equipment or an external recording medium, image formation is able to be performed by performing the same processing and performing substitution or deletion of a specific image.

EXPLANATIONS OF LETTERS OR NUMERALS

1 ... document set tray, 2 ... pickup roller, 3 ... separation roller, 4 ... separation pad, 5 ... conveyance path, 6 ... registration roller, 7 ... guide, 8 ... glass, 9 ... scanning portion, 10 ... scanning portion, 11 ... imaging lens, 12 ... CCD, 13 ... conveyance roller, 14 ... paper discharge roller, 15 ... paper discharge tray, 16 ... document platen glass, 20 ... laser exposure device, 21a ... development device, 22a ... each photoreceptor drum, 22a ... photoreceptor drum, 23a ... charger, 24a ... cleaner device, 25a ... intermediate transfer roller, 26 ... intermediate transfer belt, 27 ... intermediate transfer belt device, 28 ... intermediate transfer belt driving roller, 29 ... driven roller, 30 ... intermediate transfer belt cleaning device, 31 ... fixing device, 32 ... sheet conveyance device, 33 ... paper feed tray, 34 ... paper discharge tray, 35 ... secondary transfer device, 35a ... transfer roller, 36 ... pickup roller, 37 ... registration roller, 38a ... each conveyance roller, 39 ... pre-registration roller, 40 ... paper discharge roller, 41 ... fixing belt, 42 ... pressure roller, 43 ... fixing roller, 44 ... heating roller, 45a ... toner cartridge, 100 ... image forming device, 101 ... image reading portion, 102 ... operating panel, 102a ... operating portion, 102b ... display portion, 103 ... memory portion, 104 ... communication portion, 105 ... image forming portion, 106 ... control portion, 106a ... specific-image determining portion, 106b ... specific-image substitution processing portion, 200 ... printed matter, 201 ... printed matter, 202 ... logo mark, and 203 ... ingredient label mark.

The invention claimed is:

1. An image forming device comprising:
an image former configured or programmed to form an image on a recording medium based on image data,
a specific-image determiner configured or programmed to judge whether or not a specific image indicating information relating to ingredients of ink or toner used to form the image is included in the image data, and
a specific-image substitution processor configured or programmed to substitute the specific image with a predetermined ingredient label mark indicating the ingredients of ink or toner used by the image former when it is determined by the specific-image determiner that the image data includes the specific image, wherein
the specific-image substitution processor substitutes the specific image with the predetermined ingredient label mark having a same shape and a same size at a same position of the specific image.

2. The image forming device according to claim 1, further comprising:
a memory configured or programmed to store in advance the predetermined ingredient label mark to be associated with ingredient information indicating the ingredients of ink or toner, wherein when it is determined by the specific-image determiner that the image data includes the specific image, the specific-image substitution processor acquires the ingredient information from a recorder provided in an ink cartridge or a toner cartridge which is used in the image former, extracts the predetermined ingredient label mark stored in the memory to be associated with the acquired ingredient information from the memory, and substitutes the specific image with the extracted predetermined ingredient label mark.

3. The image forming device according to claim 2, wherein in a case where, at a time of acquiring the ingredient information from the recorder provided in the ink cartridge or the toner cartridge used in the image former, the predetermined ingredient label mark associated with the acquired ingredient information is not stored in the memory, the specific-image substitution processor deletes the specific image from the image data.

4. The image forming device according to claim 1, further comprising:
a memory configured or programmed to store in advance image data of a model pattern corresponding to the specific image, wherein
the specific-image determiner performs pattern matching of the image data and the model pattern stored in the memory, and, when it is determined that an image matching the model pattern is included in the image data, the specific-image determiner determines that the specific image is included in the image data.

5. The image forming device according to claim 1, wherein
the specific image is an image of a logo mark that displays ingredients of environmentally friendly type ink in which a vegetable-based oil is used.

* * * * *